United States Patent [19]
Sawaki

[11] Patent Number: 4,641,068
[45] Date of Patent: Feb. 3, 1987

[54] DC MOTOR DRIVING DEVICE

[75] Inventor: Manabu Sawaki, Saitama, Japan

[73] Assignee: Pioneer Electronic Corporation, Tokyo, Japan

[21] Appl. No.: 765,790

[22] Filed: Aug. 15, 1985

[30] Foreign Application Priority Data

Aug. 15, 1984 [JP] Japan ................. 59-170259

[51] Int. Cl.$^4$ ............................................. H02P 7/00
[52] U.S. Cl. .................................. 318/317; 318/257; 318/280
[58] Field of Search ............... 318/256, 257, 280, 293, 318/294, 301, 309, 317, 310, 311, 312, 313, 314, 315

[56] References Cited

U.S. PATENT DOCUMENTS

| | | | |
|---|---|---|---|
| 3,426,262 | 2/1969 | Colter | 318/313 |
| 3,878,446 | 4/1975 | Brandt | 318/317 |
| 4,035,704 | 7/1977 | York | 318/317 X |
| 4,388,572 | 6/1983 | Rosenfeldt | 318/317 |

FOREIGN PATENT DOCUMENTS 57-145588 9/1982 Japan .................. 318/317

Primary Examiner—William M. Shoop, Jr.
Assistant Examiner—Bentsu Ro
Attorney, Agent, or Firm—Sughrue, Mion, Zinn, Macpeak & Seas

[57] ABSTRACT

A driving circuit for a DC motor in which the accuracy of the voltage applied to the motor when it is driven with a fixed voltage is improved and the fixed voltage is continuously applied for fixed-speed rotation control. The emitter of a motor driving transistor is connected to the first terminal of the DC motor, the other terminal of which serves as a reference terminal. A voltage is supplied between the collector of the transistor and the reference terminal of the motor, and a bias current is supplied to the base of the transistor. A voltage source produces a voltage which is at a fixed level with respect to the potential of the reference terminal of the motor. A diode arrangement, preferably composed of serially connected transistors each of which has its collector and base connected together, passes current between the voltage source and the base of the driving transistor.

5 Claims, 2 Drawing Figures

DC MOTOR DRIVING DEVICE

BACKGROUND OF THE INVENTION

The present invention relates to a DC motor driving device.

An example of a conventional DC motor driving device is shown in FIG. 1. In this device, a digital signal is employed as an input signal, and a DC motor is rotated in a forward direction or in a reverse direction according to the content of the input signal.

In FIG. 1, input terminals $IN_0$ through $IN_2$ are connected to inputs of a decoder 1. In the decoder 1, the three-bit (in this example) parallel digital signal is subjected to logical conversion to provide a six-bit logical output at output terminals CONT, $\overline{A}$, $\overline{B}$, $\overline{C}$, $\overline{D}$ and $\overline{E}$. The output terminal CONT is connected to a voltage control circuit 2 composed of NPN transistors 201 and 202, a reference voltage generating source 204, and a resistor 205. The transistors 201 and 202 are Darlington connected, and the base of the transistor 201 is connected to the emitter of the transistor 202. A supply voltage $V_{cc}$ is applied to the collectors of the transistors 201 and 202. The emitter of the transistor 201 forms the output terminal of the voltage control circuit 2. The resistor 205 is connected between the collector and the base of the transistor 202. The base of the transistor 202 is connected through a switch 203 to the reference voltage generating source 204. The switch 203 has a control terminal connected to the output terminal CONT of the decoder 1.

The output terminals $\overline{A}$ through $\overline{E}$ of the decoder 1 and the output terminal of the voltage control circuit 2 are connected to a motor driving circuit 3. The motor driving circuit 3 has first through fifth switch circuits 4 through 8.

The first switch circuit 4 includes NPN transistors 301 through 303 and a current source 304. The transistors 301 and 302 are Darlington connected. The base of the transistor 301 is connected to the emitter of the transistor 302. The collectors of the transistors 301 and 302 are connected to a power source line 1 coupled to the output terminal of the voltage control circuit 2. The current source 304 is connected between the collector and the base of the transistor 302, the base of which is grounded through the collector and the emitter of the transistor 303. The base of the transistor 303 is connected to the output terminal $\overline{B}$ of the decoder 1.

The second switch circuit 5 includes NPN transistors 305 through 307, and a current source 308, which are arranged in the same manner as the corresponding elements of the first switch circuit 4. The base of the transistor 307 is connected to the output terminal $\overline{A}$ of the decoder 1.

The third switch circuit 6 includes NPN transistors 309 through 311, resistors 312 and 313, and a current source 314. The collector of the transistor 310 is connected to the power source line 1. The current source 314 is connected between the collector and the base of the transistor 310. The emitter of the transistor 310 is grounded through a series circuit of the resistors 312 and 313. The connecting point of the resistors 312 and 313 is connected to the base of the transistor 309, the emitter of which is grounded. The base of the transistor 310 is grounded through the collector and the emitter of the transistor 311. The base of the transistor 311 is connected to the output terminal $\overline{E}$ of the decoder 1.

The fourth switch circuit 7 is composed of NPN transistors 315 through 317, resistors 318 and 319, and a current source 320, which are arranged in the same manner as the corresponding elements of the third switch circuit 6. The base of the transistor 317 is connected to the output terminal $\overline{D}$ of the decoder 1.

The fifth switch circuit 8 includes NPN transistors 321 through 323, which are arranged in the same manner as respective components of the third switch circuit 6. The base of the transistor 323 is connected to the output terminal $\overline{C}$ of the decoder 1.

The motor driving circuit 3 thus constructed has three output terminals CMH, CMR and CMG. The emitter of the transistor 301 and the collector of the transistor 309 are connected to the output terminal CMH. The emitter of the transistor 305 and the collector of the transistor 315 are connected to the output terminal CMR. The collector of the transistor 321 is connected to the output terminal CMG. A DC motor 9 is connected between the output terminals CMH and CMR, and a series circuit of resistors 10, 11 and 12 is connected therebetween. The DC motor 9 has positive and negative terminals. The positive terminal is connected to the output terminal CMH. The connecting points of the resistors 10, 11 and 12, the negative terminal of the motor, and the output terminal CMG are connected to a constant rotation rate control circuit 13, which is constructed in the form of an integrated circuit.

In the conventional DC motor driving device thus constructed, a three-bit digital signal is applied through the input terminals $IN_0$ through $IN_2$ to the decoder 1. In the decoder 1, the three-bit digital signal is converted into a six-bit digital signal according to a suitable coding system in such a manner that conversion outputs are provided at the output terminals CONT, $\overline{A}$, $\overline{B}$, $\overline{C}$, $\overline{D}$ and $\overline{E}$ according to the contents of the input digital signal. In driving the motor 9 in the forward direction with a constant voltage, the output terminals CONT, $\overline{A}$ $\overline{C}$, and $\overline{E}$ are held at the high level and the output terminals $\overline{B}$ and $\overline{D}$ at the low level. As the output terminals $\overline{B}$ and $\overline{D}$ are at the low level and the output terminal CONT is at the high level, the switch 203 is turned on, and the reference voltage generating source 204 applies a voltage $V_{ref}$ to the base of the transistor 202. Therefore, the emitter voltage of the transistor 201, i.e., the output voltage $V_O$ of the voltage control circuit 2, can be represented by the following equation:

$$V_O = V_{ref} - V_{BE201} - V_{BE202}, \quad (1)$$

where $V_{BE201}$ is the base-emitter voltage of the transistor 201 and $V_{BE202}$ is the base-emitter voltage of the transistor 202.

The transistor 307 is rendered conductive by the high level signal from the output terminal $\overline{A}$, whereupon current from the current source 308 flows in the transistor 307. Therefore, the base potential of the transistor 306 is made substantially equal to ground potential, and the transistors 306 and 305 are rendered nonconductive. Similarly, the transistors 321 and 309 are rendered nonconductive by the high level signals from the output terminals $\overline{C}$ and $\overline{E}$. On the other hand, the transistor 303 is rendered nonconductive by the low level signal from the output terminal $\overline{B}$, in which case current from the current source 304 flows to the base of the transistor 302 so that the transistors 302 and 301 are turned on. As the output voltage $V_O$ of the voltage control circuit 2 is supplied to the base of the transistor 302, a positive potential due to the output voltage $V_O$ is supplied from the emitter of the transistor 301 through the output terminal CMH to the positive polarity terminal of the motor 9. The transistor 317 is rendered nonconductive by the low-level signal from the output terminal $\overline{D}$, whereupon current from the current source 320 flows to the base of the transistor 316 and the latter is rendered conductive. As a result, the output voltage $V_O$ of the voltage control circuit 2 is applied to the resistors 318 and 319, and the voltage divided by the resistors 318 and 319 is applied to the base of the transistor 315. Therefore, the transistor 315 is rendered conductive, and the collector potential of the transistor 315 becomes equal to ground potential. This potential is supplied through the output terminal CMR to the negative polarity terminal of the motor 9. Therefore, the voltage $V_{PM}$ applied across the terminal of the motor 9 in the normal polarity can be represented by the following equation:

$$V_{PM} = V_O - V_{BE302} - V_{BE301}, \quad (2)$$

where $V_{BE302}$ is the base-emitter voltage of the transistor 302, and $V_{BE301}$ is the base-emitter voltage of the transistor 301.

By substituting equation (1) for $V_O$ in equation (2), $$V_{PM} = V_{ref} - V_{BE201} - V_{BE202} - V_{BE302} - V_{BE301}. \quad (3)$$

In rotating the motor in the opposite direction with a fixed voltage, the output terminals CONT, $\overline{B}$, $\overline{C}$ and $\overline{D}$ of the decoder 1 are raised to the high level and the output terminals $\overline{A}$ and $\overline{E}$ are set to the low level. Because of the high level at the output terminal CONT, the output voltage $V_O$ of the voltage control circuit 2 has the value indicated by equation (1). Due to the low level at the output terminal $\overline{A}$, the transistors 306 and 305 are rendered conductive, and the positive potential due to the output voltage $V_O$ is applied through the emitter of the transistor 305 and the output terminal CMR to the negative polarity terminal of the motor 9. On the other hand, the transistor 309 is rendered conductive by the low level signal at the output terminal $\overline{E}$ so that the collector potential of the transistor 309 becomes equal to ground potential. This potential is applied to the positive polarity terminal of the motor 9 through the output terminal CMH. Therefore, a voltage $V_{MM}$ applied across the terminals of the motor 9 in the opposite polarity can be represented by the following equation:

$$V_{MM} = V_{ref} - V_{BE201} - V_{BE202} - V_{BE306} - V_{VE305}, \quad (4)$$

where $V_{BE306}$ is the base-emitter voltage of the transistor 306 and $V_{BE305}$ is the base-emitter voltage of the transistor 305.

In holding the speed of the motor 9 to a fixed speed, the output terminals CONT, $\overline{B}$ and $\overline{C}$ of the decoder 1 are set to the low level while the output terminals $\overline{A}$, $\overline{D}$ and $\overline{E}$ are raised to the high level. The switch 203 is turned off by the low level at the output terminal CONT. Therefore, the voltage $V_{cc}$ is applied to the base of the transistor 202 via resistor 205, and the transistors 202 and 201 are rendered conductive. In this operation, the output voltage $V_{OC}$ of the voltage control circuit 2 can be represented by the following equation:

$$V_{OC} = V_{cc} - V_{BE202} - V_{BE201}. \quad (5)$$

On the other hand, the transistors 302 and 301 are rendered conductive by the low level of the output terminal $\overline{B}$, and the positive potential due to the output voltage $V_{OC}$ is applied through the output terminal CMH to the positive terminal of the motor 9. The transistor 321 is turned on by the low level of the output terminal $\overline{C}$, whence the collector potential of the transistor 321 becomes equal to the ground potential. This potential is applied through the output terminal CMG to the input terminal S of the constant rotation control circuit 13. Therefore, a voltage $V_{MC}$ applied across the positive polarity terminal of the motor 9 and the input terminal S is as follows:

$$V_{MC} = V_{OC} - V_{BE302} - V_{VE301}. \quad (6)$$

By substituting equation (5) for $V_{OC}$, $$V_{MC} = V_{cc} - V_{BE202} - V_{BE201} - V_{BE302} - V_{BE301}. \quad (7)$$

In this operation, both of the transistors 305 and 315 are turned off, and therefore the output terminal CMR is placed in the open state. The circuit 13 detects the speed of the motor 9 and controls the voltage applied to the motor 9 according to the speed thus detected, thereby to maintain the speed of the motor 9 at a predetermined value.

In the conventional DC motor driving device described above, the motor driving voltage $V_{PM}$ or $V_{MM}$ used in driving the motor with a fixed voltage is lower, by the sum of base-emitter voltages of four transistors, than the reference voltage $V_{ref}$, as is apparent from equation (3) or (4). The temperature coefficient of the base-emitter voltage $V_{BE}$ is about $-2$ mV/°C., and therefore the temperature coefficient of of four base-emitter junctions is considerably large, about $-8$ mV/°C. Accordingly, the accuracy of the voltage applied to the motor 9 is inherently low. Furthermore, the voltage $V_{MC}$ applied to the series circuit of the motor 9 and the control circuit 13 is lower, by the sum of the base-emitter voltages $V_{BE}$ of four transistors, than the supply voltage $V_{cc}$, as indicated by equation (7). Therefore, sometimes a sufficiently high voltage cannot be applied to the series circuit of the motor 9 and the control circuit 13 if the supply voltage $V_{cc}$ drops, and hence the speed of the motor 9 cannot be correctly controlled.

SUMMARY OF THE INVENTION

Accordingly, an object of the invention is to provide a DC motor driving device in which the accuracy of the voltage applied to the DC motor when it is driven with a fixed voltage is improved and in which the required voltage is continuously applied for fixed-speed rotation control.

The foregoing object and other objects of the invention have been achieved by the provision of a DC motor driving device which, according to the invention, comprises: a transistor whose emitter is connected to one terminal of a DC motor; voltage supplying means for applying a supply voltage between the collector of the transistor and the other terminal of the DC motor with the other terminal of the DC motor being employed as a reference potential terminal; bias supplying means for supplying a bias current to the base of the transistor; a voltage generating source for generating a fixed reference voltage with respect to the reference potential; and diode means provided to pass current between the base and the voltage generating means.

The nature, principle and utility of the invention will become more apparent from the following detailed description when read in conjunction with the accompanying drawings.

DESCRIPTION OF THE PREFERRED EMBODIMENTS

An example of a DC motor driving device according to the invention will be described with reference to FIG. 2.

Figure 1:
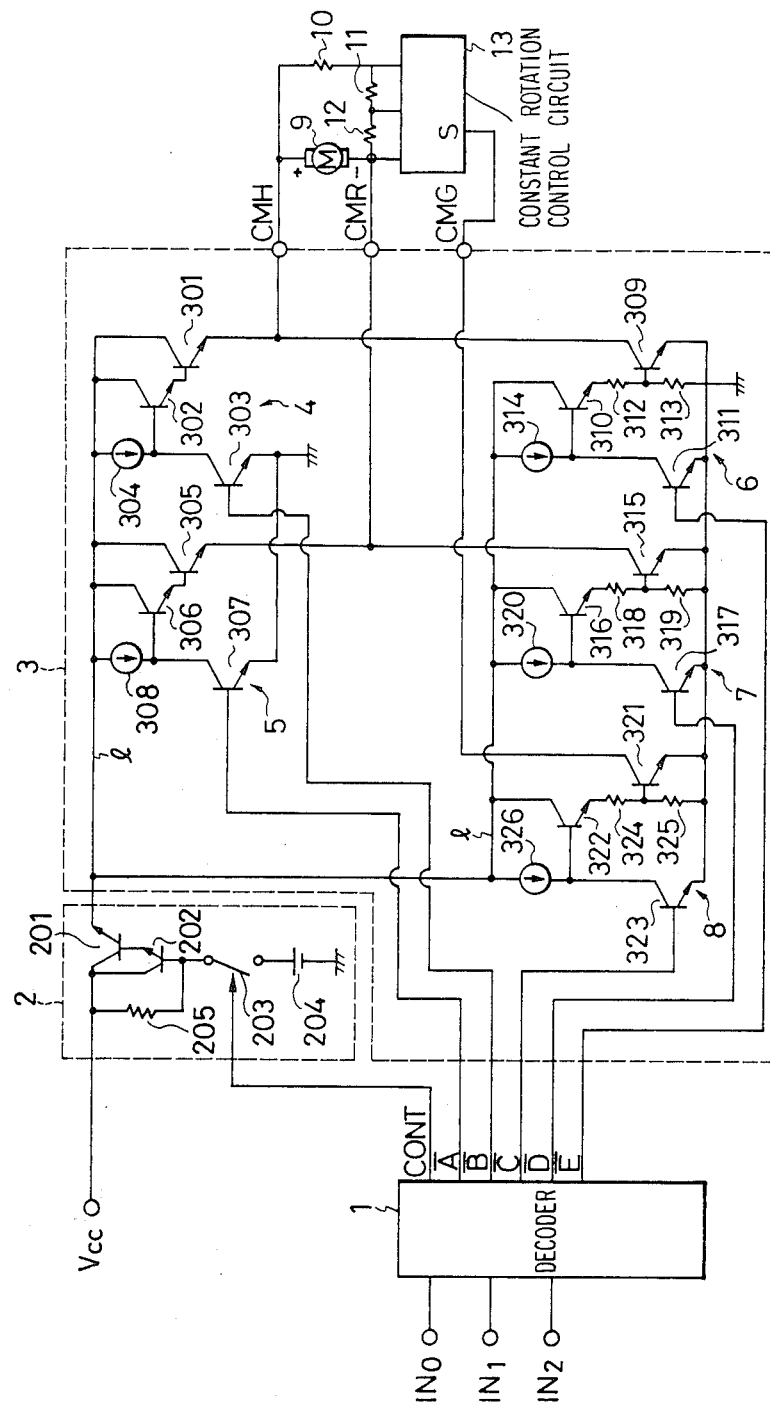
FIG. 1 is a circuit diagram showing an example of a conventional DC motor driving device.
Figure 2:
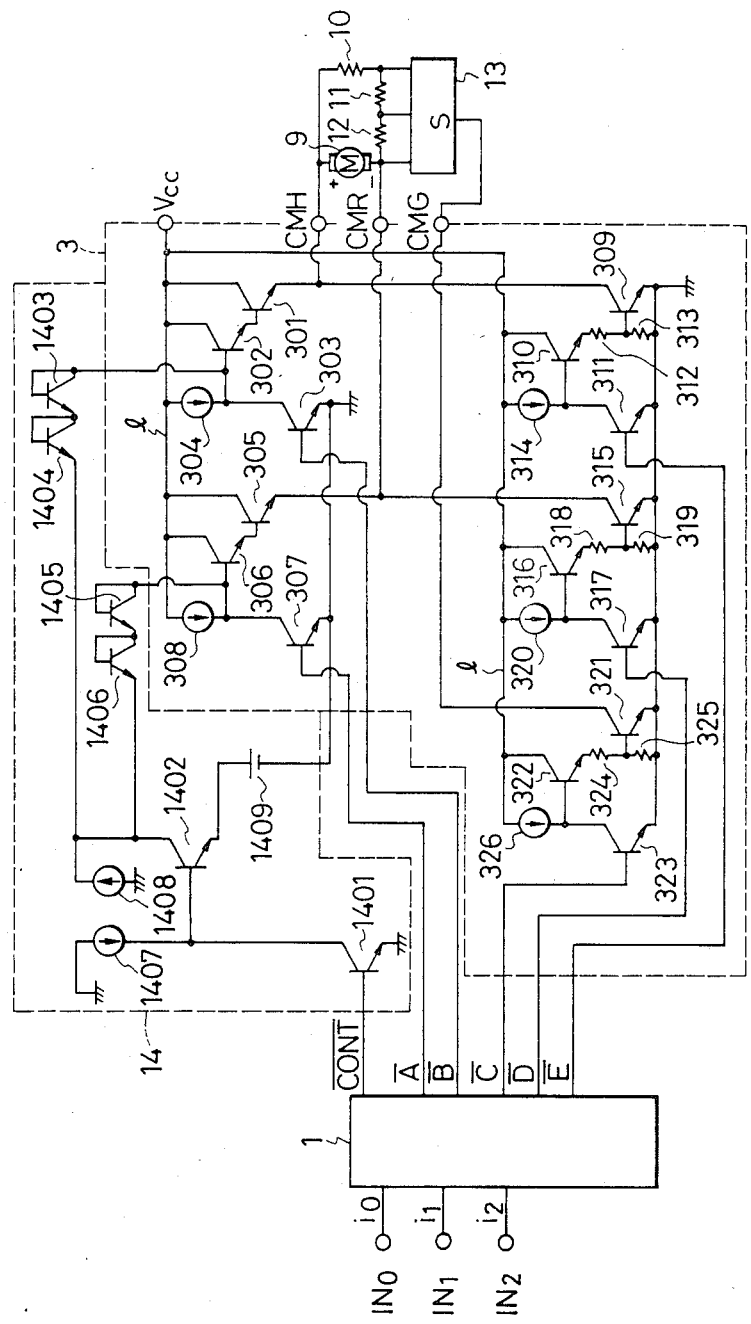
FIG. 2 is a circuit diagram showing an example of a DC motor driving device according to the invention.

In FIG. 2, those components which have been described with reference to FIG. 1 are designated by the same reference numerals or characters.

As shown in FIG. 2, a decoder 1 has output terminals $\overline{CONT}$, $\overline{A}$, $\overline{B}$, $\overline{C}$, $\overline{D}$ and $\overline{E}$. The output terminal $\overline{CONT}$ is connected to a voltage control circuit 14 composed of NPN transistors 1401 through 1406, current sources 1407 and 1408, and a reference voltage generating source 1409. The base of the transistor 1401 is connected to the output terminal $\overline{CONT}$, the collector is connected to the base of the transistor 1402, and the emitter is grounded. The current source 1407 is connected between ground and the collector of the transistor 1401. The emitter of the transistor 1402 is connected to the reference voltage generating source 1409 so that the reference voltage $V_{ref}$ is supplied to the emitter. The current source 1408 is connected between the collector of the transistor 1402 and ground. Each of the transistors 1403 through 1406 has its collector connected to its base. The emitter of the transistor 1403 is connected to the collector of transistor 1404, and the base of the transistor 1403 is connected to the base of the transistor 302. The emitter of the transistor 1404 is connected to the collector of the transistor 1402. The transistors 1405 and 1406 are coupled between the base of the transistor 306 and the collector of the transistor 1402 in the same manner. The power source line 1 of a motor driving circuit 3 is supplied with a supply voltage $V_{cc}$. The remaining arrangement of the DC motor driving device of the invention is the same as that of the device shown in FIG. 1.

In the DC motor driving device thus constructed, the decoder 1 subjects input digital signals to logical conversion in accordance with the following truth table:

| Input | | | Output | | | | | | Motor control |
|---|---|---|---|---|---|---|---|---|---|
| $i_2$ | $i_1$ | $i_0$ | $\overline{CONT}$ | $\overline{A}$ | $\overline{B}$ | $\overline{C}$ | $\overline{D}$ | $\overline{E}$ | condition |
| 0 | 0 | 0 | 0 | 1 | 1 | 1 | 1 | 1 | OFF |
| 0 | 0 | 1 | 0 | 1 | 0 | 1 | 0 | 1 | Driving in forward direction with fixed voltage |
| 0 | 1 | 0 | 0 | 0 | 1 | 1 | 1 | 0 | Driving in reverse direction with fixed voltage |
| 0 | 1 | 1 | 1 | 1 | 0 | 0 | 1 | 1 | Fixed-speed rotation control |
| 1 | 0 | 0 | 0 | 1 | 1 | 1 | 0 | 0 | Brake |

In driving the motor in the forward direction with a fixed voltage, the digital signal applied to the input terminals $i_0$, $i_1$ and $i_2$ of the decoder 1 is "100". As the decoder 1 provides positive logical outputs, the output terminals $\overline{CONT}$, $\overline{B}$ and $\overline{D}$ are held at the low level while the output terminals $\overline{A}$, $\overline{C}$ and $\overline{E}$ are held at the high level. The low level signal at the output terminal $\overline{B}$ renders the transistors 302 and 301 conductive, and the low level signal at the output terminal $\overline{D}$ renders the transistor 315 conductive. As the transistors 305, 309 and 321 are rendered nonconductive, the base potential of the transistor 302 is supplied through the base-emitter of the transistor 302, the base-emitter of the transistor 301, and the output terminal CMH to the positive polarity terminal of the motor 9. Ground potential is applied from the transistor 315 through the output terminal CMR to the negative polarity terminal of the motor 9. Therefore, the voltage $V_{PM}$ applied to the motor 9 in the normal polarity can be represented by the following equation:

$$V_{PM} = V_{B302} - V_{BE302} - V_{BE301}, \tag{8}$$

where $V_{B302}$ is the base potential of the transistor 302.

Further, the low level at the output terminal $\overline{CONT}$ renders the transistor 1401 nonconductive, and current from the current source 1407 flows to the base of the transistor 1402 to render the latter conductive. Therefore, the collector potential of the transistor 1402 is then equal to the reference voltage $V_{ref}$ of the reference voltage generating source 1409. This collector potential is supplied to the base of the transistor 302 through the diode-connected transistors 1404 and 1403. The base potential $V_{B302}$ of the transistor 302 is:

$$V_{B302} = V_{ref} + 2V_{BE}, \tag{9}$$

where $V_{BE}$ is the base-emitter voltage of each of the transistors 1403 and 1404.

From equations (8) and (9), $$V_{PM} = V_{ref} + 2V_{BE} - V_{BE} - V_{BE302} - V_{BE301}. \tag{10}$$

If it is assumed that $V_{BE} \cong V_{BE302} \cong V_{BE301}$, then equation (10) can be rewritten as follows:

$$V_{PM} \cong V_{ref}.$$

In driving the motor 9 in the reverse direction with a fixed voltage, the digital signal applied to the input terminals, $i_0$, $i_1$ and $i_2$ is "010". The output terminals $\overline{CONT}$, $\overline{A}$ and $\overline{E}$ of the decoder 1 are held at the low level. Therefore, the transistors 306, 305 and 309 are rendered conductive while the transistors 301, 315 and 321 are rendered nonconductive so that the base potential of the transistor 306 is applied to the negative polarity terminal of the motor 9 through the base-emitter of the transistor 306, the base-emitter of the transistor 305, and the output terminal CMR. Therefore, the voltage $V_{MM}$ applied to the motor 9 in the opposite polarity is:

$$V_{MM} = V_{ref} + 2V_{BE} - V_{BE306} - V_{BE305} \cong V_{ref}. \tag{11}$$

In controlling the speed of the motor 9 so as to a maintain in at a fixed value, the digital signal applied to the input terminals $i_0$, $i_1$ and $i_2$ is "110". Therefore, the output terminals $\overline{CONT}$, $\overline{A}$, $\overline{D}$ and $\overline{E}$ of the decoder 1 are held at the high level while the output terminals $\overline{B}$ and $\overline{C}$ are held at the low level. The low level signal at the output terminal $\overline{B}$ renders the transistors 302 and 301 conductive and the low level signal at the output terminal $\overline{C}$ renders the transistor 321 conductive. As the transistors 305 and 315 are rendered nonconductive, the base potential of the transistor 302 is supplied through the base-emitter of the transistor 302, the base-emitter of the transistor 301, and the output terminal CMH to the positive polarity terminal of the motor 9. Ground potential is applied through the output terminal CMG to the input terminal S of the constant rotation control circuit 13. The high level at the output terminal $\overline{\text{CONT}}$ renders the transistor 1401 conductive, and current flows to the transistor 1401 from the current source 1407. Therefore, the collector potential of the transistor 1401 (i.e., the base potential of the transistor 1402) becomes equal to ground potential and the transistor 1402 is rendered nonconductive. The diode-connected transistors 1403 and 1404 are turned off, being reverse-biased by the current source 1408. Therefore, the base potential of the transistor 302 becomes equal to the supply voltage $V_{cc}$. Accordingly, the voltage $V_{MC}$ applied across the positive polarity terminal of the motor 9 and the input terminal S is as follows:

$$V_{MC} = V_{cc} - V_{BE302} - V_{BE301}. \quad (12)$$

As is apparent from the above description, in the DC motor driving device of the invention, the voltage clamped by the diode arrangement, having a forward voltage corresponding to the base-emitter voltage of the motor driving transistor, is applied to the base of the driving transistor. Therefore, in driving the motor with a fixed voltage, the effect of the base-emitter voltage of the driving transistor on the voltage applied to the motor is cancelled out. Therefore, fixed-voltage driving of the motor can be achieved with an extremely small temperature coefficient. In the case of fixed-voltage rotation control, in the voltage applied to the series circuit of the motor and the fixed-rotation control circuit, the voltage drop due to the base-emitter voltage of the driving transistor is about half that in the prior art arrangement. Therefore, the control characteristic in the event of supply voltage drop is greatly improved.

Furthermore, if the circuit of the DC motor driving device is provided in the form of a monolithic integrated circuit, then the temperature throughout the chip is substantially uniform, and hence, because all the transistors in the chip operate at the same temperature, they have very small differences in their base-emitter voltages. Moreover, since the inventive voltage control circuit, unlike the conventional circuit, uses no power transistors, the DC motor driving device can be manufactured in the form of an integrated circuit with a smaller chip area.

I claim:
1. A DC motor driving device comprising:
   a motor driving transistor having an emitter connected to a first terminal of a DC motor whose rotational speed is voltage-controllable;
   voltage supplying means for applying a supply voltage between a collector of said transistor and a second terminal of said DC motor, a potential at said second terminal of said DC motor being employed as a reference potential;
   bias supplying means for supplying a bias current to a base of said transistor;
   voltage generating source means for generating a fixed reference voltage, with respect to said reference potential, for voltage-controlling said rotational speed, and
   diode means for passing current between said base and said voltage generating source means to reduce the effect of the base-emitter voltage of said driving transistor on the voltage applied to said motor.
2. The DC motor driving device of claim 1, wherein said diode means comprises at least one transistor having a base and a collector connected together.
3. A DC motor driving device comprising:
   a motor driving transistor having an emitter connected to a first terminal of a DC motor;
   voltage supplying means for applying a supply voltage between a collector of said transistor and a second terminal of said DC motor, a potential at said second terminal of said DC motor being employed as a reference potential;
   bias supplying means for supplying a bias current to a base of said transistor;
   a voltage generating source for generating a fixed reference voltage with respect to said reference potential; and
   diode means provided to pass current between said base and said voltage generating source;
   wherein said driving transistor comprises a Darlington-connected transistor pair, and wherein said diode means comprises first and second transistors each having a base and a collector connected together, said first and second transistors being connected in series with one another.
4. A DC motor driving device comprising:
   a motor driving transistor having an emitter connected to a first terminal of a DC motor;
   voltage supplying means for applying a supply voltage between a collector of said transistor and a second terminal of said DC motor, a potential at said second terminal of said DC motor being employed as a reference potential;
   bias supplying means for supplying a bias current to a base of said transistor;
   a voltage generating source for generating a fixed reference voltage with respect to said reference potential; and
   diode means provided to pass current between said base and said voltage generating source;
   wherein said voltage generating source comprises a fixed voltage source having a first terminal connected to said second terminal of said DC motor, a reference transistor having an emitter connected to a second terminal of said fixed voltage source, a first current source connected in series with a collector of said reference transistor, and a second current source connected to a base of said reference transistor.
5. The DC motor of claim 4, further comprising means for controlling the flow of current from said second current source to said base of said reference transistor in response to a binary control signal.

* * * * *